March 21, 1944.                L. H. BROWN                2,344,673
                          SAFETY ROLLER COUPLING
                        Filed Feb. 16, 1942          2 Sheets-Sheet 2
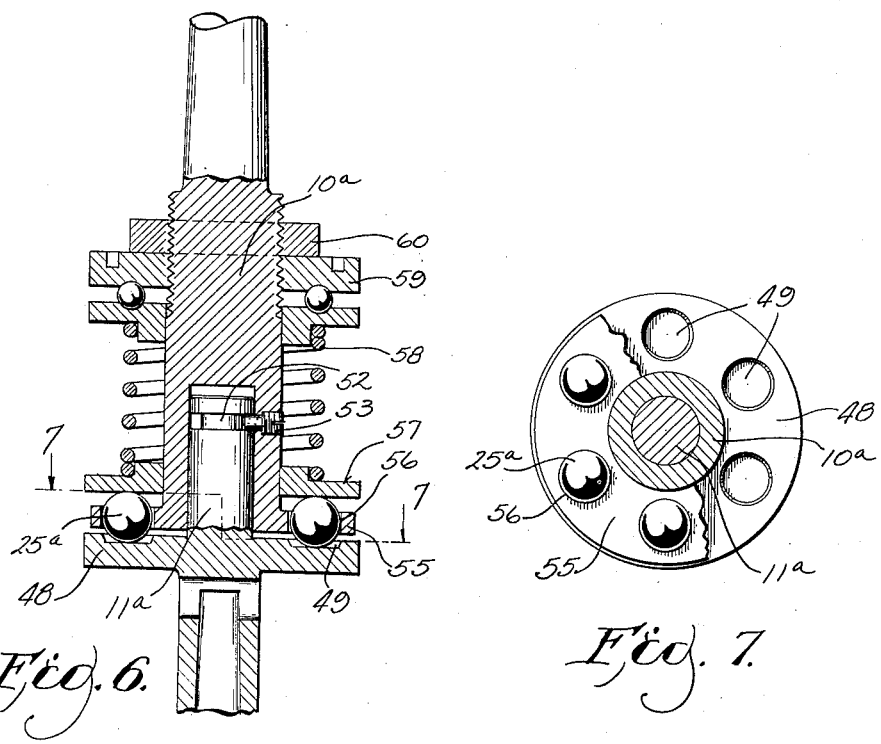
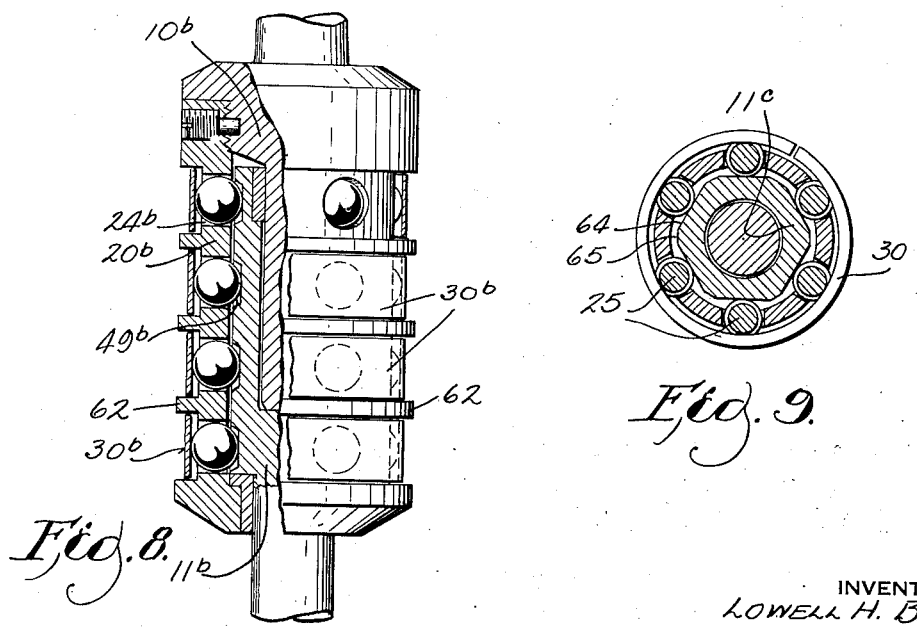
INVENTOR
LOWELL H. BROWN
BY
Wheeler, Wheeler & Wheeler
ATTORNEYS.

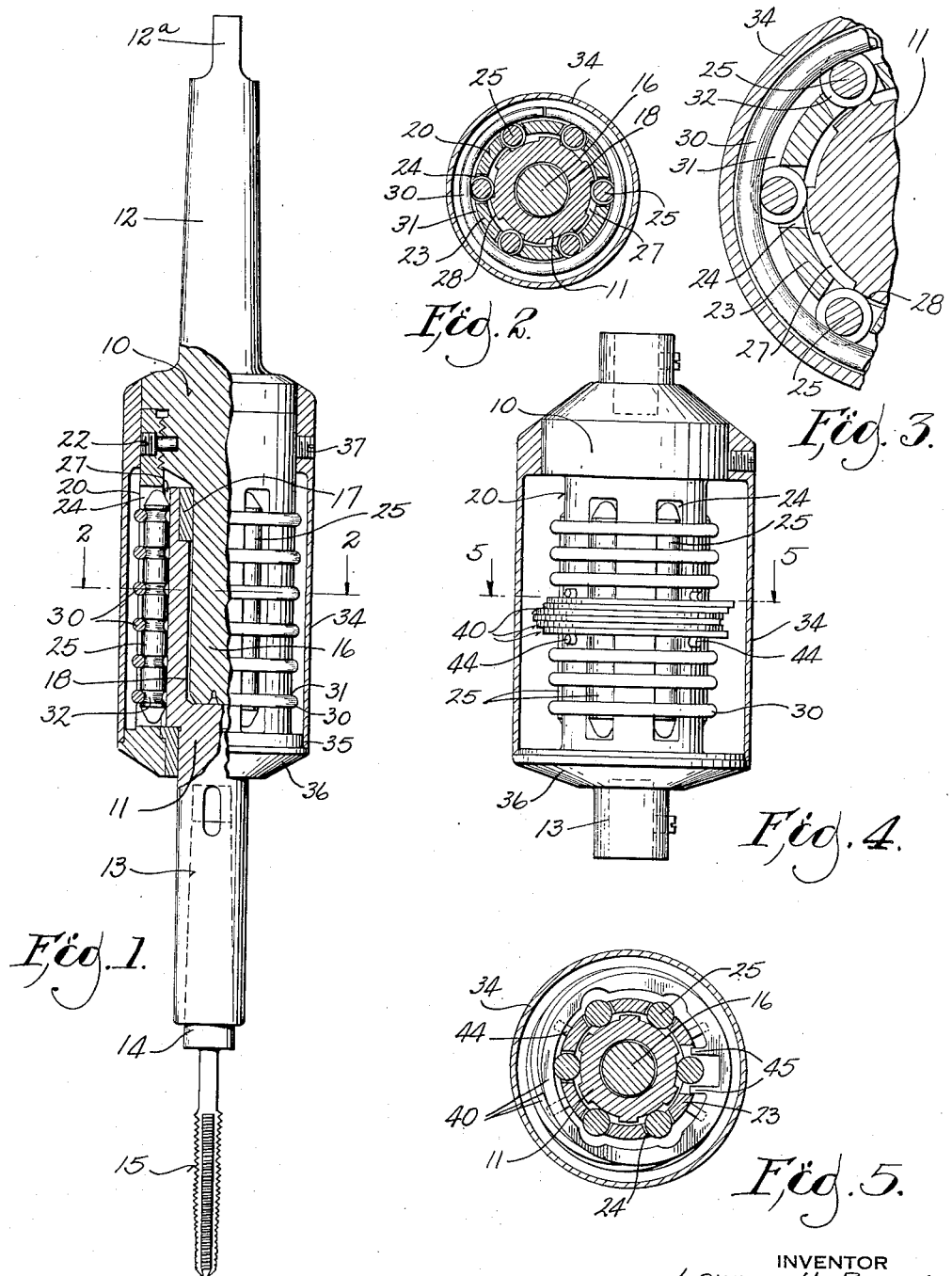

Patented Mar. 21, 1944

2,344,673

UNITED STATES PATENT OFFICE 2,344,673

SAFETY ROLLER COUPLING

Lowell H. Brown, Waukesha, Wis.

Application February 16, 1942, Serial No. 431,007

10 Claims. (Cl. 64—29)

My invention relates to improvements in safety roller couplings.

Primarily, the object of my invention is to provide a coupling for rotative members, in which power may be transmitted from a driving to a driven member through a set of rollers adapted to automatically release the driven member under a predetermined degree of overload.

More particularly stated, it is my object to provide the driving and driven members of a rotary coupling with an interposed motion transmitting roller, or annular series of rollers, each partially socketed in one of the members under a resiliently yielding predetermined degree of pressure, and under such conditions that the roller or rollers will automatically withdraw and shift from one socket to another in a succession of uncoupling and recoupling operations whenever the driven member encounters abnormal resistance. Thereby the driving member may continue in operation without motion transmission to the driven member until the excessive resistance can be eliminated or the power shut off. Said coupling, however, is continuously capable of automatically resuming motion transmitting operations as soon as the resistance to motion transmission is reduced to a predetermined normal range.

Heretofore shear pins and friction clutches have been employed to prevent damage to more expensive parts of mechanisms in which the driven member is subject to occasional overloads or sudden stoppage. But shear pins must be replaced before operations can be resumed, and friction clutches are subject to rapid deterioration and inconstant driving efficiency.

It is also my object to provide means whereby, when excessive resistance is encountered by the driven member, the motion transmitting rollers may shift from one socket to another noisily or with a clicking sound, thus signalling the operator that motion transmission has ceased.

A further object is to provide means for counter-balancing centrifugal force developed in the motion transmitting elements, whereby the resilient resistance to uncoupling operations may be kept constant at varying rates of rotation.

In the drawings:

Figure 1 is an elevational sectional view of one form of my improved roller coupling.

Figure 2 is a sectional view of the same, drawn to line 2—2 of Figure 1.

Figure 3 is an enlarged fragmentary view, drawn to the same plane as Figure 2, but showing the rollers retracted from their respective sockets in the driven member.

Figure 4 is an elevation, with the housing sleeve in section, and showing counter-balancing rings adapted for use when the driving and driven members are rotated at a speed at which centrifugal force tends to reduce the predetermined resistance to outward movement normally imposed upon the rollers.

Figure 5 is a sectional view, drawn to line 5—5 of Figure 4, with the roller retaining springs removed to avoid obscuration of the eccentric roller retainers.

Figure 6 is a sectional view, showing a modification in which the rollers are normally engaged in sockets formed in the side face of an annular flange on the driven member.

Figure 7 is a sectional view drawn to line 7—7 of Figure 6.

Figure 8 is a view similar to Figure 1, showing a second modification, in which ball rollers are substituted for the cylindrical rollers shown in Figure 1.

Figure 9 is a sectional view drawn to the same plane as Figure 2, and showing a third modification in which the rollers travel about the hexagonal shank of one of the members.

Like parts are identified by the same reference characters throughout the several views.

In Figures 1, 2 and 3, the member 10 may be assumed to be the driving member and the member 11 the driven member of my improved coupling. As illustrated, the driving member 10 has a tapered shank 12, provided with a tang 12a for connection with the spindle of a drilling and tapping machine, and the driven member 11 is associated with a tool holder 13, adapted to receive the shank 14 of the tap 15, or of any other rotary boring or drilling tool.

In the construction illustrated, the driving member 10 has a portion 16 which is axially socketed in the driven member 11, a bushing 17 being preferably provided to aid in centering the member 16 in the socket 18. A slotted sleeve or roller cage 20 encircles the member 11 and may be connected with the member 10 by a set screw 22, whereby this sleeve cage is caused to rotate with the driving member 10. Aside from facilitating construction and assembly, it is not material whether this cage is integral with the driving member 10, or separately formed.

The cage 20 is provided with an annular row of slots 24 and intermediate bars 23. The slots 24 receive a set of motion transmitting rollers 25, which are also socketed to an extent substantially equal to one sixth of their diameter in grooves 27 formed longitudinally in the otherwise cylindrical outer surface of the driven member 11.

The rollers 25 are normally held in the grooves 27 under predetermined resilient pressure applied in any suitable manner. One or more split rings 30 of resilient material may encircle the cage, and between the slots 24 may be engaged in ring positioning arcuate grooves 31 in the cage. The rings 30 may also engage in annular grooves 32 in the respective rollers. A housing sleeve 34, spaced from the split rings 30, may be seated at 35 on an annular flange 36 connected with the driven member, and at its other end may be secured to the driving head by a set screw 37.

The rollers 25 are held by the split rings 30 in the grooves 27 of the driven member under sufficient tension for normal motion transmission. But when rotation of the driven member is stopped by an unyielding obstruction, or when it is subjected to resistance in excess of a predetermined degree of overload, the rollers 25 will roll out of their grooves 27, as illustrated in Figure 3, and will travel over the intermediate cylindrically curved outer surfaces 28 of the member 11 into the next groove 27, into which each roller will be forced by the ring or rings 30 with a sharp metallic clicking sound.

The grooves 27 are preferably made wide enough to allow a short interval for roller travel along the bottom of the groove before it again rolls out of the groove and over into the next groove. Therefore, after the rollers have initially climbed out of their respective grooves they will continuously roll over the surfaces 28 and into and out of succeeding grooves with increased facility without wearing or hammering the shoulders over which they climb, and without transmitting severe shocks to the driven member when they contact those shoulders.

The spacing between the housing 34 and the rings 30 is sufficient to allow the necessary radial movement of the rollers in traveling from one groove 27 to the next, and this travel of the rollers about the driven member 11 may continue indefinitely, with no transmission of motion to the driven member until the noisy signals call the attention of the operator to the fact that rotation of the driven member has ceased. When the cause of the stoppage has been eliminated, no readjustment of the coupling is required to enable it to resume normal motion transmitting operations.

My invention is particularly desirable for use in association with high speed drilling and tapping mechanism in which drills and taps are frequently broken during final penetration of the work, due to the presence of burs or uncut material of a thickness too great to be sheared by the tool. I have found that by the use of my invention, breakage of exceedingly small drills and other tools operating at from 1500 to 2500 R. P. M. may be substantially eliminated, although heretofore such breakage has been very frequent.

At high speeds there is a tendency for the rollers to be driven outwardly by centrifugal force, and to keep the driving torque constant at different speeds, I may provide the cage with a series of roller retaining eccentric rings 40, (Figures 4 and 5), of greater width or weight on one side than the other. The heavier side will tend to move outwardly by centrifugal force, thereby drawing the lighter side inwardly toward the axis of the coupling. In the construction illustrated, these rings are anchored against rotation relative to the driving member 10, and they are also held against movement longitudinally of the coupling. Convenient means for providing such anchorage is illustrated in Figures 4 and 5.

Projections 44 on the cage bars 23 prevent the rings from moving axially of the coupling, and the wider or heavier part of each ring is provided with inwardly projecting anchoring arms 45 which engage the associated cage bars 23, the spacing between the cage bars on that side being sufficient to allow the arms 45 to enter between them and the adjacent roller. These eccentric retaining rings each have their wider portion extending in a direction opposite that in which an associated roller tends to move when centrifugally actuated. Therefore the rings have their weighted portions extending in different directions and not only balance the centrifugal force developed in the respective rollers, but also balance each other. The internal diameters of the rings are sufficient to allow the rollers to roll out of their sockets under predetermined load as above explained, in which event the weighted sides of the rings will be drawn inwardly to a sufficient extent to allow the rollers to shift from one groove to the next as above explained.

These eccentric rings are, of course, applicable to the structure as illustrated in Figures 1, 2 and 3, if the housing 34 is made sufficiently large. However, the counter-balancing rings are not necessary unless the driving speed is varied under different conditions, for if the driving speed in any given mechanism is always the same the tension of the split rings 30 may be relied upon to impose a constant resistance to outward movement of the rollers.

In Figure 6, the driven member 11a is provided with a flange 48 having an annular series of sockets 49 in its upper face to receive a set of spherical rollers or balls 25a. In this construction, the driven member 11a is socketed in the lower end portion of the driving member 10a and is provided with an annular groove 52 to receive a retaining pin or stud 53, having a head portion in threaded engagement with the driving head.

The lower end of the driving head is provided with an annular flange 55 provided with ball receiving apertures 56, and adapted to serve as a cage for the balls. A collar 57 bears yieldingly upon the upper surfaces of the balls against which it is held by a helical spring 58, one end of which is seated against the collar 57, the other end being seated against a collar 59 threaded to the driving member 10a and secured by a lock nut 60.

In operation of the coupling illustrated in Figures 6 and 7, motion is transmitted from the driving to the driven member through the balls 25a, which move out of their sockets 49 when the resistance exceeds a predetermined degree of overload. The released balls are each carried by the cage 55 to the next socket, the balls dropping into the sockets with a clicking sound as above described.

With comparatively slight structural changes, the coupling illustrated in Figures 1, 2 and 3 may be modified to allow the use of ball rollers in place of the cylindrical rollers above described. Such a modification is illustrated in Figure 8, in which the driving and driven members 10b and 11b are substantially the same as illustrated in Figure 1. In this structure the periphery of the driven member 11b is provided with sockets 49b similar to the sockets 48 shown in Figure 7. The cage 20b is provided with apertures 24b in place of the slots 24 shown in Figure 1, and the balls are resiliently held in their sockets by flat split rings 30b, held in place by cage projections 62.

In Figure 9, the construction of the coupling is like that shown in Figure 1, except that a driven member 11c is hexagonal in form as to that portion in contact with the rollers 25. In this construction the rollers are normally held to the flat faces 64 of the hexagon but travel over the corners 65 when the driven member encounters an obstruction or an excessive resistance. For light duty this construction will be found satisfactory, although for heavier loads the construction in the other views will be preferred.

Various other modifications may be made within the scope of my invention and in the light of this disclosure.

My invention has a wide range of usefulness, not only in association with drill presses, but also in association with power driven rotary kitchen utensils, washing machines, stokers, outboard motors, and any other power transmitting mechanism wherein shear pins or friction clutches have been heretofore used to avoid breakage when the driven member encounters excessive resistance. The illustrations, and the expressions adopted in explaining them, are used for the purpose of description and not of limitation.

I claim:

1. A safety roller coupling for rotary driving and driven members, comprising the combination of a driving member having a sleeve-like extension provided with longitudinal slots, a driven member in telescoped relation to said extension and provided with corresponding longitudinal grooves, rollers loosely engaged in said slots, each roller having a relatively small segment normally engaged in one of the grooves, and split rings of resilient material encircling said sleeve-like extension to hold the rollers from outward movement in said slots under normal power transmitting conditions, said rings being free from attachment to either the driving or driven member and adapted to be actuated by the rollers when rolling from one groove to the next.

2. A safety roller coupling as set forth in claim 1, in which the split rings are loosely engaged in anchorage grooves in said sleeve-like extension and in the respective rollers to prevent relative displacement.

3. A safety roller coupling, comprising the combination of concentric driving and driven members, one provided with an annular row of grooves and the other provided with an opposing roller cage, rollers normally socketed in said grooves, with their major portions loosely guided by the cage, resilient split ring means for holding the rollers in the cage and sockets under normal resistance encountered by the driven member, and means for counter-balancing the centrifugal force of each roller to keep the spring resistance constant under varying speeds of rotation.

4. A safety roller coupling, comprising the combination of concentric driving and driven members, one provided with an annular row of grooves and the other provided with an opposing roller cage, rollers normally socketed in said grooves, with their major portions loosely guided by the cage, resilient split ring means for holding the rollers in the cage and sockets under normal resistance encountered by the driven member, means for counter-balancing the centrifugal force of each roller to keep the spring resistance constant under varying speeds of rotation, said counter-balancing means comprising counter-weighted rings concentric to the roller cage, and ring anchoring means adapted to loosely fix the position of each ring with its weighted side in a position to utilize its centrifugal force to counter-balance that of a roller on the opposite side of the cage.

5. In a safety roller coupling, the combination of a rotary driven member having a concentric set of driving rollers, projections extending radially outward between the rollers, and means mounted on the rollers and otherwise unconnected for resiliently opposing movement of the rollers over said projections, said driven member being formed to allow rotative travel of the rollers between and over said projections, and said resilient opposing means being adapted to allow the rollers to roll freely out of their sockets and from one socket to the next when the load on the driven member exceeds a predetermined degree.

6. In a safety roller coupling, the combination of a cylindrical driving member provided with roller receiving apertures, a poly-sided driven member within said driving member, rollers in said apertures each normally bearing upon one of the sides of the driven member, and spring means for applying resilient pressure to said rollers in the direction of the driven member, said spring means being loosely supported on the rollers and free for advancement by them when the latter are in rolling contact with said polysided member.

7. A safety roller coupling comprising a set of driving and driven members, connected by oppositely disposed motion transmitting rollers, one of said members having a cage loosely embracing the rollers and the other having sockets of a depth equal to minor segments of the rollers, annular pressure means freely revoluble with reference to the both members and arranged to bear resiliently upon the rollers opposite the roller sockets therein, said pressure means being adapted to subject the rollers to resilient pressure, predetermined with reference to that required to hold the rollers in said sockets when the driven member is under normal load, said pressure being insufficient to prevent the rollers from leaving their sockets, and traveling in rolling contact with the socketed member, when the load on the driven member exceeds a predetermined degree.

8. A safety roller coupling, comprising the combination of concentric driving and driven members, one provided with an annular row of longitudinally extending grooves, and the other provided with an opposing roller cage, rollers normally socketed in said grooves, with their major portions loosely guided by the cage, resilient split ring means for holding the rollers in the sockets under normal resistance encountered by the driven member, said rollers being free for rolling travel into and out of said grooves, and said ring means being free to travel with the rollers independently of either the driving or driven members.

9. A safety roller coupling comprising concentric driving and driven members of a generally cylindrical form, the driving member being provided with longitudinally extending cage bars and the driven member having corresponding shallow channels, interposed longitudinally extending motion transmitting cylindrical rollers normally having minor segments engaged in said channels and major segments loosely engaged between the cage bars, and resiliently yielding retaining bands for holding the rollers normally in such position, said retaining bands being free to yield and travel with the rollers independently of the driving and driven members when the load imposed on the driven member exceeds a predetermined degree.

10. In a safety roller coupling, the combination of axially aligned rotative driving and driven members having portions provided with normally opposing roller receiving sockets, the sockets in one member being shallow and of a depth equal to about one sixth of the diameter of the rollers, and means, free from attachment to either the driving or driven members and adapted to hold the rollers in the sockets of both members in opposition to normal centrifugal torque pressures, while allowing them to roll freely out of the shallow sockets and from one such socket to the next when the load on the driven member exceeds a predetermined degree.

LOWELL H. BROWN.